C. D. BINGHAM.
VISE.
APPLICATION FILED DEC. 14, 1910.
994,240.
Patented June 6, 1911.
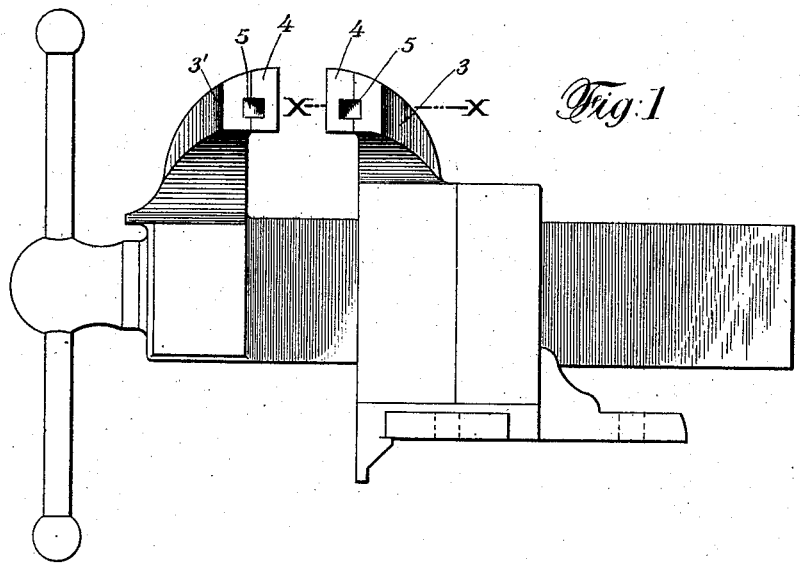
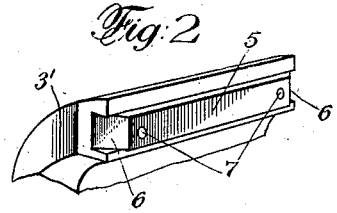
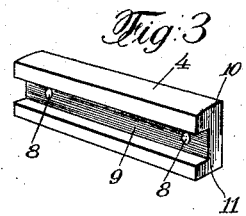
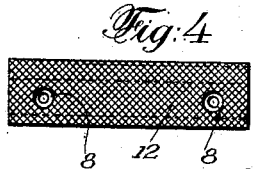
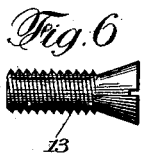
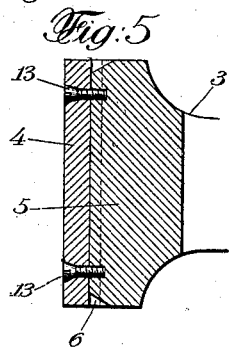
Witnesses
Charles D. Bingham,
Inventor,
By Attorneys
Kenyon & Kenyon

UNITED STATES PATENT OFFICE.

CHARLES D. BINGHAM, OF WATERTOWN, NEW YORK, ASSIGNOR TO PRENTISS VISE COMPANY, A CORPORATION OF NEW YORK.

VISE.

994,240.  Specification of Letters Patent.  Patented June 6, 1911.

Application filed December 14, 1910.  Serial No. 597,231.

*To all whom it may concern:*

Be it known that I, CHARLES D. BINGHAM, a citizen of the United States, and a resident of Watertown, in the county of Jefferson and State of New York, have invented certain new and useful Improvements in Vises, of which the following is a specification.

My invention relates to vises, and more particularly to the manner of securing and removing face plates from the main jaws of vises.

Vises used by machinists and in machine shops generally, usually have the jaw faces made of steel in order to resist wear. These steel faces have usually been united to the main jaw of the vise by welding or casting the steel face plate on the vise jaw; and in a few instances, the face plates have been detachably secured to the jaw pieces.

Where the face plate has been formed integral with the jaw piece, as by welding or casting, when any extensive damage occurs to the steel face, it is necessary to scrap the entire vise jaw to which the face plate is attached, and which in other respects may be in perfect condition. The cost of replacing the entire jaw will be considerable as compared to the cost of a new face plate only, and in order to avoid this expense, it has been proposed to detachably secure the face plates to the jaws. But heretofore it was impossible to secure the face plates to the jaws as firmly and rigidly as the ordinary use of the vise necessitated, because the constant hammering and side thrusts upon the work in the vise and the great pressure with which the vise jaws are forced together on the work, all tend, if the plate is tightly driven onto the interlocking part of the jaw, to bind the interlocking parts tighter together than when first assembled, so that if the face plate had been placed on with a driving fit in the first instance, by compression and expansion of the interlocking parts, it would, with use, soon become so tightly bound on the jaw that it would be impossible with plates as then constructed, to remove them from the jaw, without seriously marring, if not breaking, the ends of the cap or one of its flanges. When the vise is used for delicate and coarse work, as most vises are, it is desirable to remove the hard steel cap plate and replace it with a soft metal plate such as brass; and when the jaws are thus frequently shifted as they would be in the ordinary course of work, the damage to the cap plates in removing them becomes all the more serious, and in a short time the plates, and in some instances the adjacent interlocking portion of the jaw, are so marred and battered that they become useless. If it is attempted to avoid this difficulty by having anything less than a good driving fit between the interlocking portions of the vise jaw and cap plate, then after the vise has been in use for a short while, these heavy thrusts and strains being taken up unequally by the interlocking parts, loosen the connecting screws and in some instances break the interlocking flanges. When the jaws of the vise are clamped upon the work, if the plates are the least bit loose, they are apt to tilt out of the parallel and either bite in on the work or grip it only through a part of the area of the face plate, thus lessening the gripping action of the vise.

In order to overcome these difficulties, and to produce a vise in which the face plates may be rigidly and firmly secured at all times and readily and frequently removed without marring either the face plate or the adjacent interlocking portion of the jaw, I provide well machined rectangular interlocking portions on the back of the face plate and on the adjacent portion of the jaw, of such dimensions that the face plate is forced on with a good driving fit so as to be rigidly and firmly supported throughout the interlocking portions, thus preventing any unequal strains or stresses which, after some use, would tend to loosen the plate on the jaw. I also provide suitable countersunk screws to assist in holding the cap plate on the jaw, and in order to enable a ready removal of the cap plate from the jaw, I chamfer or bevel away one extremity of the interlocking portion of the jaw, leaving the adjacent surface of the face plate exposed so that an ordinary metal tool or other suitable piece of metal may be placed against the back or inner surface of the face plate so as to transmit substantially the whole force of a blow outwardly and substantially at right angles to the face of the vise. By this means substantially the whole force of the blow will be directed against the inner surface of the cap plate to readily force it off.

My invention will be more fully understood by the following description taken in connection with the accompanying drawings forming a part of this specification, and in which—

Figure 1 is an end elevation of a vise; Fig. 2 is a perspective view of the upper portion of the vise jaw with the detachable face plate removed; Fig. 3 is a perspective view showing the back of the face plate; Fig. 4 is a front elevation of the face plate; Fig. 5 is a sectional elevation of the vise jaw with the plate attached, taken on line x—x of Fig. 1 and showing the beveled end of the jaw and the manner of removing the face plate; and Fig. 6 is an enlarged view of the screw used to assist in holding the face plate to the jaw.

Referring to the drawings, 1 is a stationary and 2 the movable part of the vise, each having jaws 3, 3' to which are detachably secured the face plates 4. A rectangular tongue or projection 5 is formed on the face of each jaw, the tongue being displaced slightly from the center of the jaw toward the lower end thereof. One or both ends of the tongue are beveled or chamfered away as shown at 6; and suitable screw holes 7 are drilled and then tapped in the tongue adjacent each end.

The face plates 4 are formed from a substantially rectangular piece of metal, which has holes 8 bored therein, corresponding to the holes in the tongue, and suitably flared out on the gripping side to provide for countersinking the heads of the connecting screws. In one face of the cap plate is planed a rectangular groove 9 which is carefully machined to substantially the exact cross section of the tongue so as to necessitate a good driving fit to force the tongue into the groove. This groove is slightly displaced from the center of the face plate to the same extent that the tongue was displaced from the center of the jaw, so as to form the upper flange 10 of the face plate thicker than the lower flange 11. This is desirable, since most of the strain in the vise comes upon the upper part of the face. The opposite face 12 of the face plate is then roughened in any approved manner.

The fit between the face plate and the jaw, as formerly mentioned, is such that it requires a hard driving fit to force the face plate onto the jaw, and after the plate has been driven on in position so that the tongue fits squarely and firmly within and throughout the groove, then the screws 13, which have heads of relatively small diameter in order to take up as little area of the gripping face as possible, are inserted in the holes 8 and screwed down into the holes 7 in the tongue, in which position the heads of the screws are countersunk below the gripping face of the face plate, so that the plate is held upon the jaw both by the driving fit between the interlocking parts and by the screws. With this driving fit, the slight spreading or expanding of the tongue 4, due to compression, will all the more tend to firmly unite the plate and jaw. With the face plates secured in this manner, it will be impossible, by any use of the vise, to loosen the plates on the jaw, resulting in untrue gripping faces. With the plate thus securely held upon the jaw, it would be practically impossible to remove it without seriously marring, if not breaking, the ends of the plate; and the difficulty experienced in removing the plates would be such, regardless of the damage thereto, as to make it impractical to frequently shift from soft metal to steel plates for different classes of work. But by beveling or chamfering away the extremity of the tongue 4, I am enabled to insert an ordinary tool or other metallic implement in such a position as to direct substantially the whole force of a blow directly upon the back of the face plate and away from the jaw. By such a construction the face plate may be readily removed by the use of any ordinary tool or implement lying around, and by a blow which is comparatively light as compared with a blow necessary if a wedge action were used, which would not only require the use of a special wedge-shaped tool, which in itself would tend to mar the adjacent end surfaces of the plate and jaw, but would also require a heavier blow, which tends to a greater marring of the parts.

Having thus described my invention, what I claim as new and desire to secure by Letters Patent, is:

In a vise, the combination of a jaw piece, a tongue formed thereon rectangular in cross section, a detachable face plate for the jaw having a channel, rectangular in cross section, formed in its face adjacent the jaw and of substantially the same cross section as the tongue so as to require a driving fit to force the plate on the jaw, said channel being of the same cross section from end to end and slightly displaced from the center of the plate toward the lower edge to form an upper lateral flange thicker than the lower flange, the ends of said face plate extending flush with the ends of the jaw piece, countersunk screws at each end passing through the plate into said tongue to assist in detachably securing the plate to the tongue, one or more ends of the tongue being beveled off at an angle to the bottom surface of the channel to expose a portion of said surface so that a tool may be inserted between the flanges of the face plate and guided thereby to direct and transmit substantially the whole force of a blow outwardly against the face plate to force the same off of the tongue without straining or marring the adjacent parts or ends of said jaw and face plate.

In testimony whereof, I have signed my name to this specification, in the presence of two subscribing witnesses.

CHAS. D. BINGHAM.

Witnesses:
CHAS. F. BLAKE,
E. L. HUTCHINGS.

Copies of this patent may be obtained for five cents each, by addressing the "Commissioner of Patents, Washington, D. C."